United States Patent [19]

Kugo

[11] Patent Number: 5,487,580
[45] Date of Patent: Jan. 30, 1996

[54] CHUCK UNIT

[75] Inventor: Daisaku Kugo, Nagaokakyo, Japan

[73] Assignee: Murata Manufacturing Co., Ltd., Japan

[21] Appl. No.: 217,380

[22] Filed: Mar. 24, 1994

[30] Foreign Application Priority Data

Mar. 24, 1993 [JP] Japan ..................... 5-090813

[51] Int. Cl.$^6$ .................. B25J 15/00; B23P 21/00
[52] U.S. Cl. .................... 294/119.1; 294/103.1; 29/759; 414/780
[58] Field of Search ............. 294/2, 103.1, 104, 294/119.1, 86.4, 902; 414/589, 751, 780, 781, 783, 784; 901/31, 39; 29/742, 757, 759, 760

[56] References Cited

U.S. PATENT DOCUMENTS

| | | | |
|---|---|---|---|
| 3,850,313 | 11/1974 | Rackman et al. | 901/39 |
| 3,866,966 | 2/1975 | Skinner, II | 901/39 |
| 4,653,794 | 3/1987 | Atlas | 294/119.1 |
| 4,866,824 | 9/1989 | Falk et al. | 291/119.1 |
| 5,015,139 | 5/1991 | Baur | 294/104 |
| 5,172,951 | 12/1992 | Jacobsen et al. | 294/104 |

FOREIGN PATENT DOCUMENTS

1255430  9/1986  U.S.S.R. .................. 901/39

*Primary Examiner*—Dean Kramer
*Attorney, Agent, or Firm*—Ostrolenk, Faber, Gerb & Soffen

[57] ABSTRACT

A chuck unit for automatically inserting a workpiece in a receiving portion, which comprises a fixed pawl, first and second movable pawls and a pusher. Both major surfaces of the workpiece are chucked by a first vertical surface of the fixed pawl and the first movable pawl, and both side edges of the workpiece are chucked by a second vertical surface of the fixed pawl being perpendicular to the first vertical surface and the second movable pawl. The pusher is vertically movable between the first vertical surface and the first movable pawl for downwardly extruding the workpiece. Since two major surfaces and two side edges of the workpiece are held by the pawls, the attitude and position of the workpiece are corrected therein. Therefore, this chuck unit is suitable for assembling a plurality of workpieces which are arranged in a thickness direction thereof in an aligned manner.

4 Claims, 12 Drawing Sheets

CHUCK UNIT

BACKGROUND OF THE INVENTION

The present invention relates to a chuck unit, which is suitable for inserting a plurality of workpieces into a receiving portion in a direction parallel to the major surfaces of these workpieces in an aligned manner.

Figure 1:
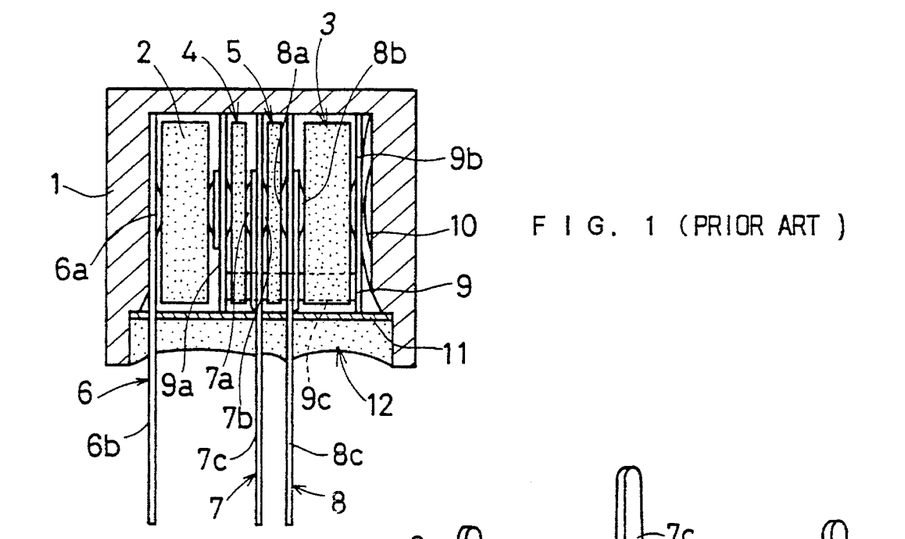
FIG. 1 is a sectional view showing a conventional four-element ladder-type filter.
Figure 2:
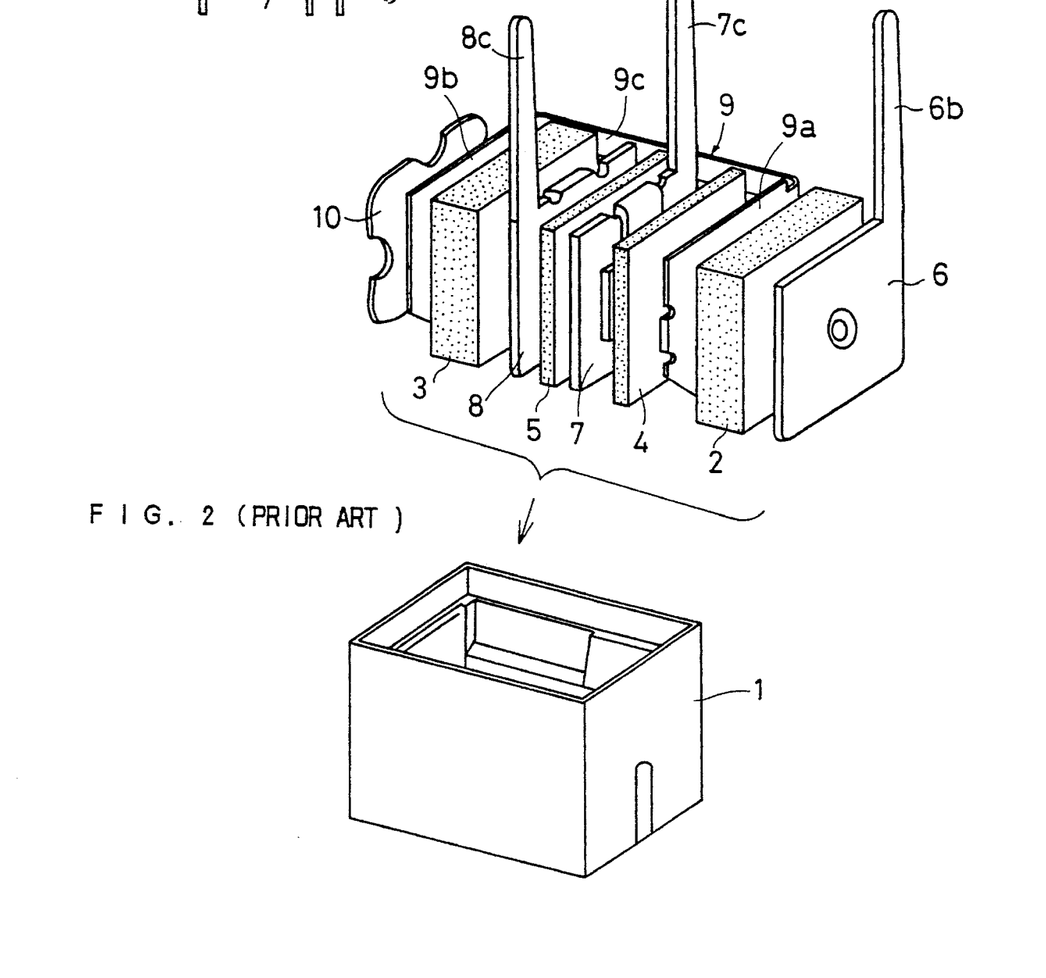
FIG. 2 is an exploded perspective view of the filter shown in FIG. 1.
Figure 3:
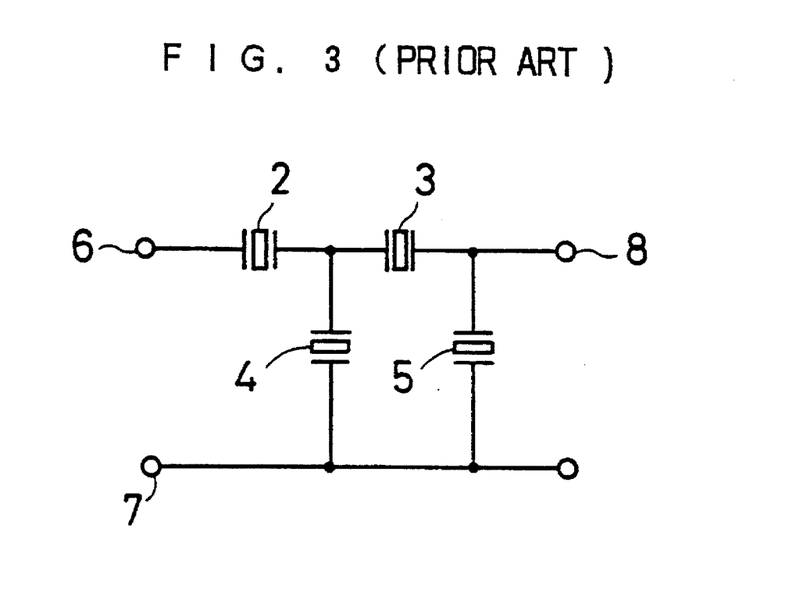
FIG. 3 is an circuit diagram of the filter shown in FIGS. 1 and 2.

FIGS. 1 and 2 show a conventional four-element ladder-type filter. This filter comprises two series ceramic resonators 2 and 3, two parallel ceramic resonators 4 and 5, an input terminal plate 6, a ground terminal plate 7, an output terminal plate 8, an internal connection terminal plate 9 and a plate spring 10, which are stored in a box-type case 1. Outlines of these inner parts are substantially equivalent to each other. FIG. 3 is a circuit diagram showing the electrical connection thereof.

The input terminal plate 6 is provided on its one major surface with a protruding portion 6a which is in pressure contact with a central portion of the series resonator 2. The ground terminal plate 7 is provided on both of its major surfaces with protruding portions 7a and 7b which are in pressure contact with central portions of the two parallel resonators 4 and 5 respectively. The output terminal plate 8 is provided on both of its major surfaces with protruding portions 8a and 8b which are in pressure contact with central portions of the parallel resonator 5 and series resonator 3 respectively. The internal connection terminal plate 9 has a portion 9a which is inserted between the series resonator 2 and parallel resonator 4, a portion 9b which is arranged next to an outer major surface of the series resonator 3, and a coupling portion 9c which connects these portions 9a and 9b. Since the plate spring 10 is interposed between the portion 9b and an inner side surface of the case 1, the terminals 6–9 and the resonators 2–5 are in pressure contact with each other to be electrically connected.

A cover sheet 11 is inserted in an opening of the case 1, and a cavity which is defined by the cover sheet 11 and the opening is filled up with filler 12 such as resin, thereby the opening of the case 1 is sealed. Lead portions 6b, 7c and 8c of the input terminal 6, the ground terminal 7 and the output terminal 8 protrude through the cover sheet 11 from the opening of the case 1.

When the filter having the aforementioned structure is assembled in a conventional manner, the parts 2–5 and 6–10 are manually inserted one by one with tweezers in the case 1. Therefore, the working efficiency of the conventional manual insertion is quite low. In order to improve this working efficiency, it may be desirable to automatically assemble this filter by a chuck unit, such as a robot or the like.

SUMMARY OF THE INVENTION

Accordingly, an object of the present invention is to provide a chuck unit which can automatically insert workpieces into a receiving portion, thereby highly improving working efficiency.

Another object of the present invention is to provide a chuck unit which can hold the workpieces correctly in position and in attitude.

The chuck unit according to the present invention is adapted to chuck and downwardly extrude a workpiece. This chuck unit comprises a fixed pawl, first and second movable pawls, and a pusher. The fixed pawl has a first vertical surface for supporting one of the major surfaces of the workpiece and a second vertical surface being perpendicular to the first vertical surface for stopping one side edge of the workpiece. The first movable pawl which is movable oppositely to the first vertical surface has a third vertical surface for pushing the other one of the major surfaces of the workpiece in order to hold both of the major surfaces in association with the first vertical surface. The second movable pawl which is movable oppositely to the second vertical surface has a fourth vertical surface for pushing the workpiece against the second vertical surface. The pusher is vertically movable between the first vertical surface and the third vertical surface for downwardly extruding the workpiece.

First, both side edges of the workpiece are held by the second vertical surface of the fixed pawl and the second movable pawl so that the workpiece is corrected in attitude, and then both major surfaces of the workpiece are held by the first vertical surface and the first movable pawl so that the workpiece is corrected in position. Next, the chuck unit is moved to a receiving portion so that the pusher pushes down the upper edge of the workpiece, whereby the workpiece is correctly inserted in a receiving portion. The first movable pawl may preferably be opened in association with the pushing operation of the pusher so that both major surfaces of the workpiece are not in sliding contact with the first vertical surface and the first movable pawl.

The fixed pawl and the first movable pawl may preferably have vertical grooves on the opposite positions of the first vertical surface and the third vertical surface so that the pusher vertically moves along a clearance defined by the grooves. In this case, since the pusher does not interfere with the fixed pawl and the first pawl, the workpiece having thinner thickness than that of the pusher can be easily extruded by the pusher.

When the second movable pawl has a wedge-shaped cross section tapered to an outer side thereof and extends downwardly beyond the fixed pawl and the first movable pawl to a portion close to a lower end of the workpiece, the chuck unit may preferably move horizontally in a direction of the outer side of the second movable pawl. In this case, upper portions of already inserted workpieces in the receiving portion are separated from each other by the second movable pawl so that a new one is laterally inserted therebetween, and then the new one is downwardly pushed by the pusher when it reaches the position corresponding to the receiving portion. Therefore, the new workpiece is smoothly inserted in a small clearance between the already inserted ones.

According to the present invention, as hereinabove described, the chuck unit has functions of chucking the workpiece and correcting its attitude as well as inserting the workpiece, whereby it is possible to automatically assemble a plurality of parts into a product such as a ladder-type filter which includes the parts arranged in a thickness direction thereof in an aligned manner, thereby remarkably improving working efficiency.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
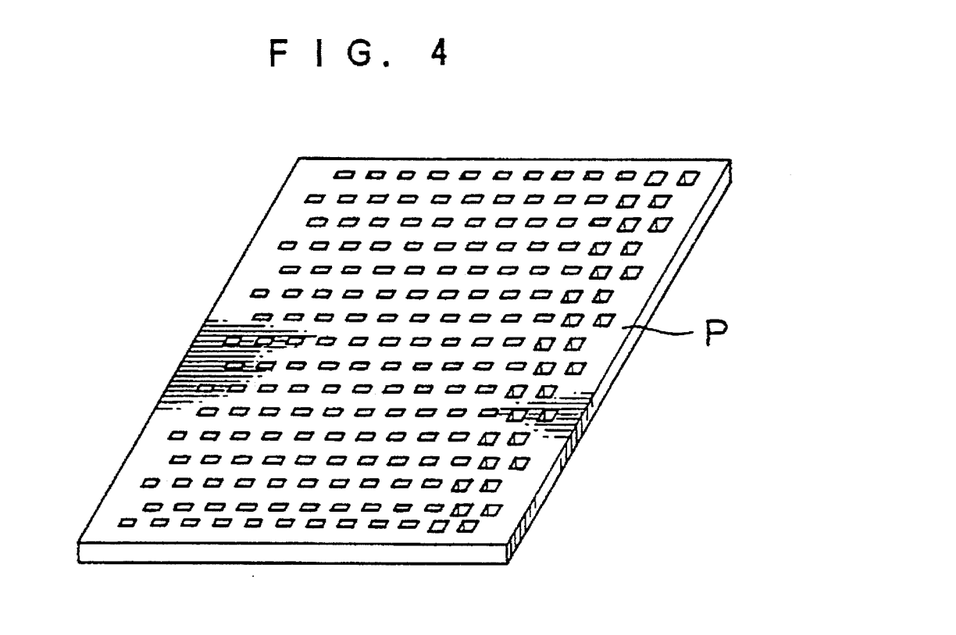
FIG. 4 is a perspective view showing a pallet.
Figure 5:
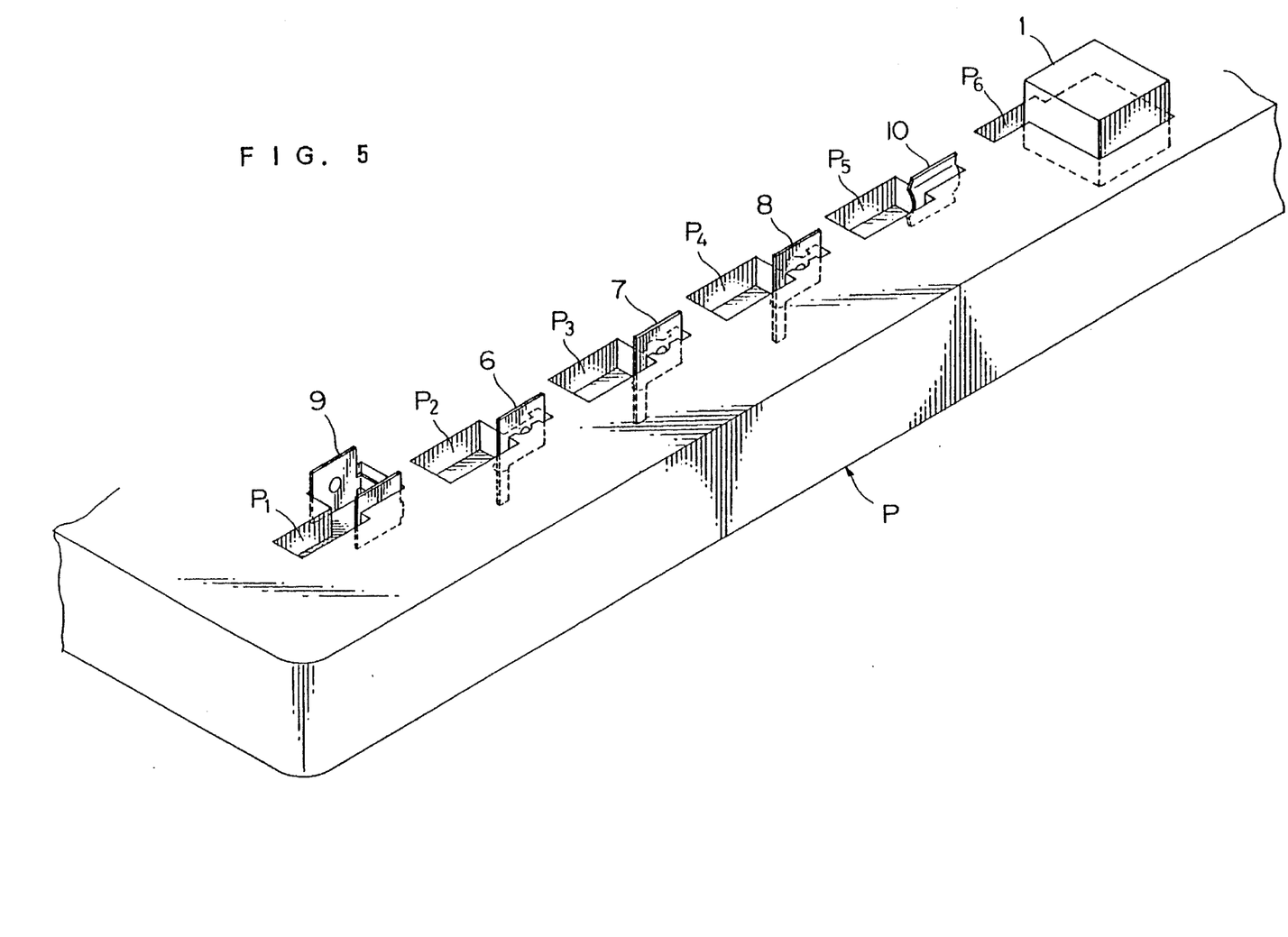
FIG. 5 is a partially enlarged perspective view showing the pallet.

FIGS. 4 and 5 show an exemplary pallet P which is used in the present invention. This pallet P is a plate which comprises a number of cavities $P_1$–$P_6$ formed on an upper surface thereof for receiving respective parts separately in constant arrangement. The internal connection terminal plate 9, the input terminal plate 6, the ground terminal plate 7, the output terminal plate 8, the plate spring 10 and the case 1 as shown in FIGS. 1 and 2, are inserted and vertically held in the cavities $P_1$–$P_6$ respectively. When the parts are thus inserted in this pallet P, upper halves of the parts protrude from the upper surface of the pallet P.

The respective parts such as the case 1, resonators 2–5 and the terminals 6–9 forming a ladder-type filter are similar to those shown in FIGS. 1 and 2, and hence redundant description is omitted.

FIGS. 6–12 show a chuck unit 21. This chuck unit 21 is adapted to take out the parts from the pallet P and from an element-supply unit 26 to insert the parts in an assembly jig 27 as described later.

Figure 6:
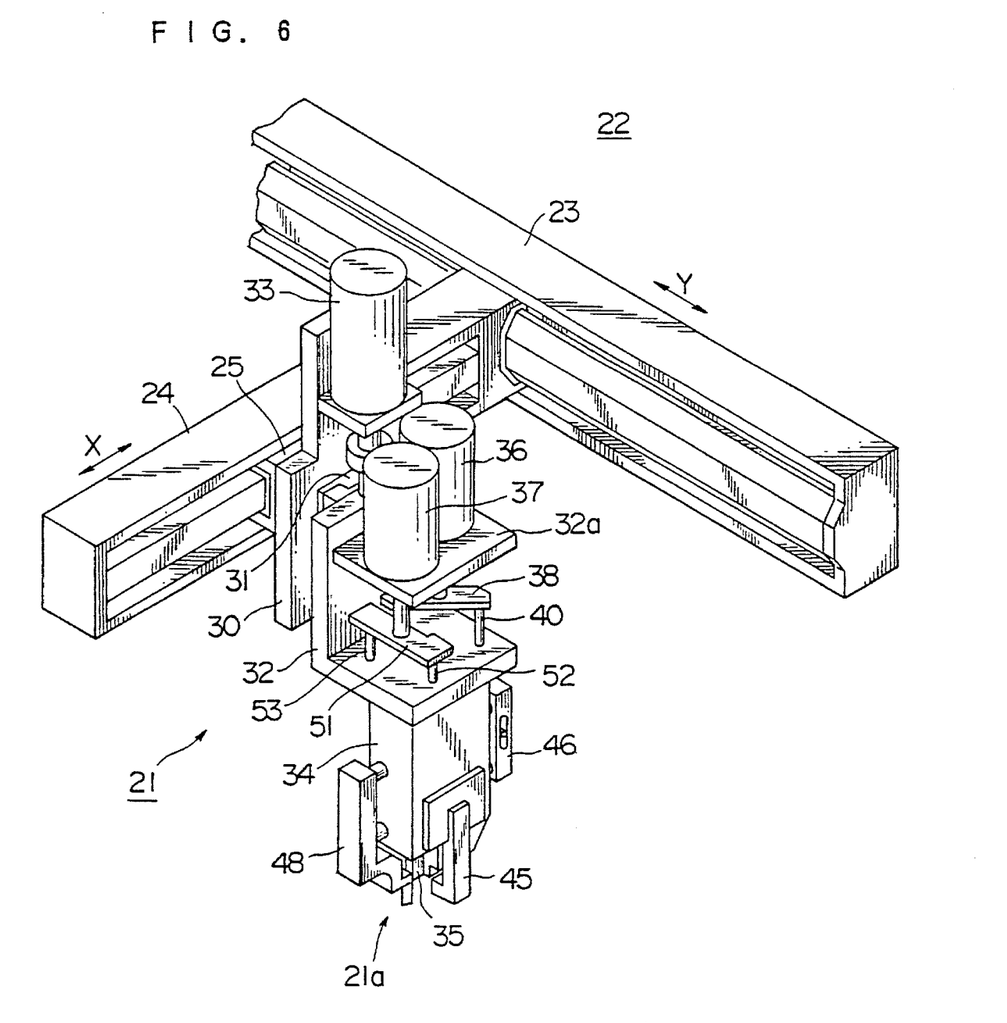
FIG. 6 is a general perspective view showing a chuck unit.

As shown in FIG. 6, the chuck unit 21 is horizontally movable by an X-Y robot 22. The robot 22 comprises a guide 23, an arm 24 which is movable in a direction Y along the guide 23, and a head portion 25 which is movable in a direction X along the arm 24. A back plate 30 of the chuck unit 21 is fixed to the head portion 25, and an L-shaped slide table 32 is vertically slidably supported by the back plate 30 through a slide rail 31. A lift cylinder 33 is fixed on the back plate 30, for vertically moving the slide table 32. A guide block 34 is fixed to the lower surface of the slide table 32, and a fixed pawl 35 is formed on a lower end portion of the guide block 34. First and second cylinders 36 and 37 are set on a stage 32a which is fixed at an upper portion of the slide table 32.

Figure 7:
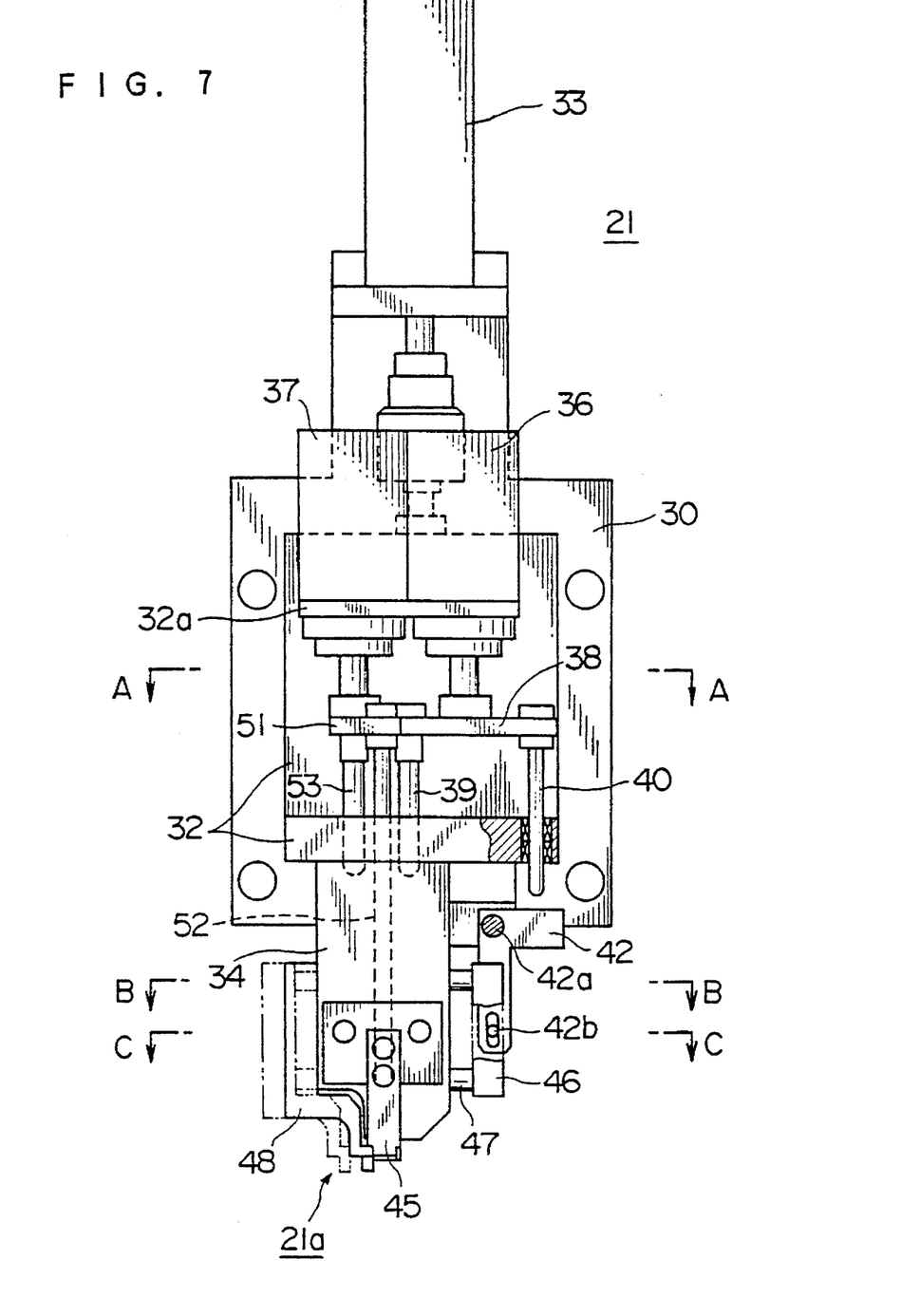
FIG. 7 is a front elevational view showing the chuck unit.
Figure 8:
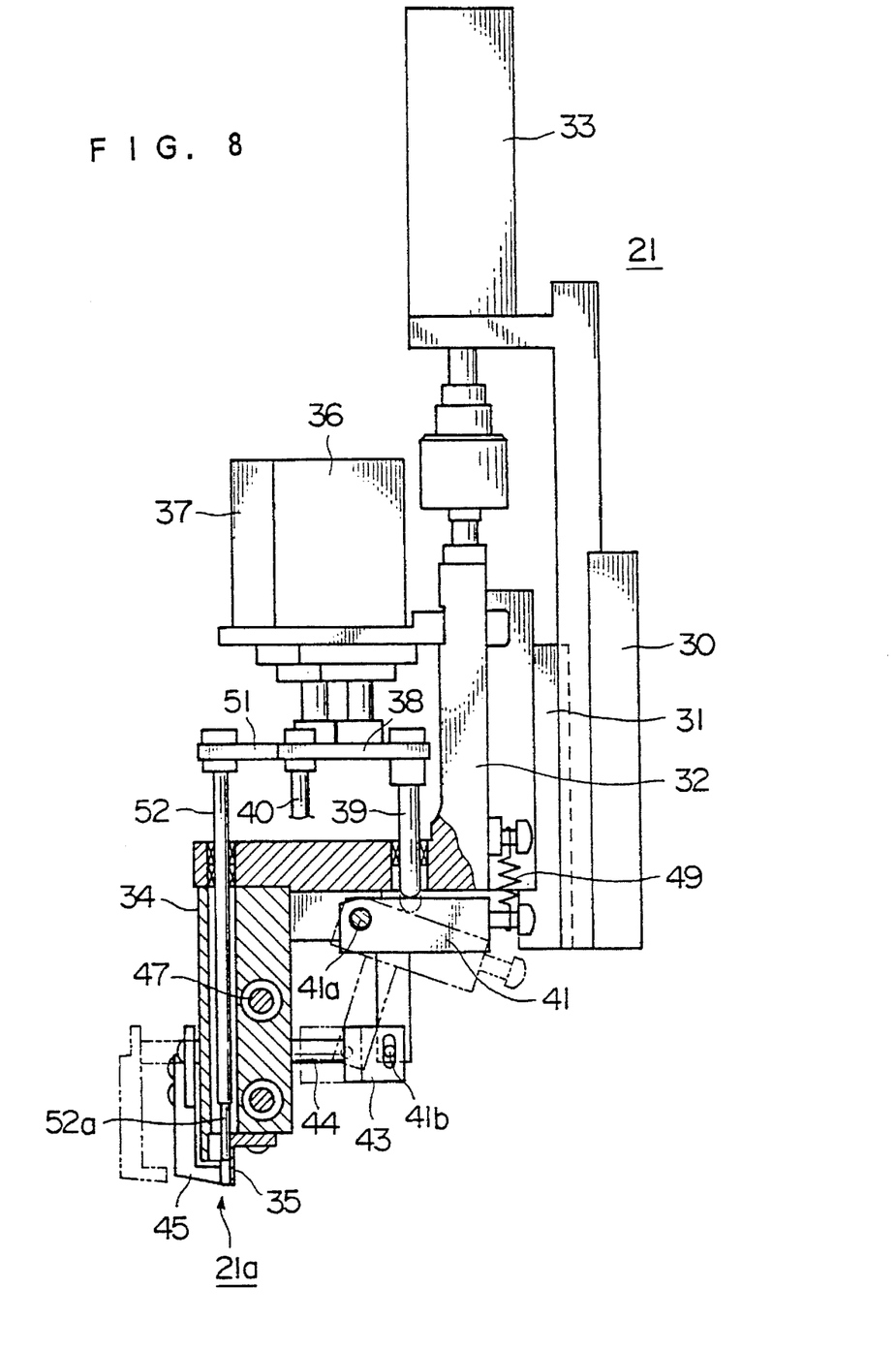
FIG. 8 is a right side elevational view showing the chuck unit.
Figure 9:
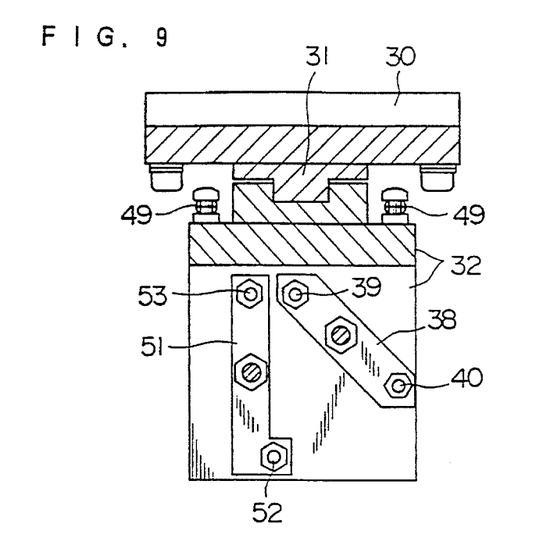
FIG. 9 is a sectional view taken along the line A—A in FIG. 7.
Figure 10:
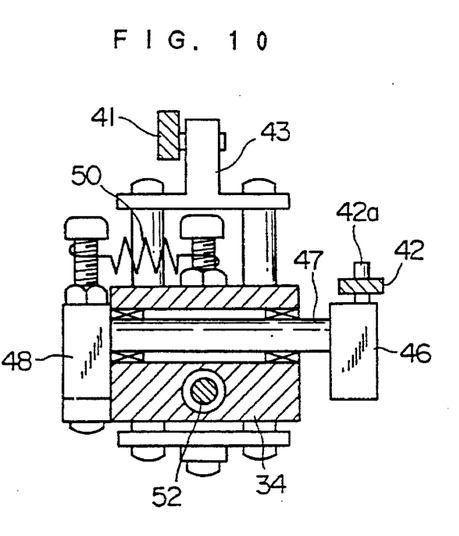
FIG. 10 is a sectional view taken along the line B—B in FIG. 7.
Figure 11:
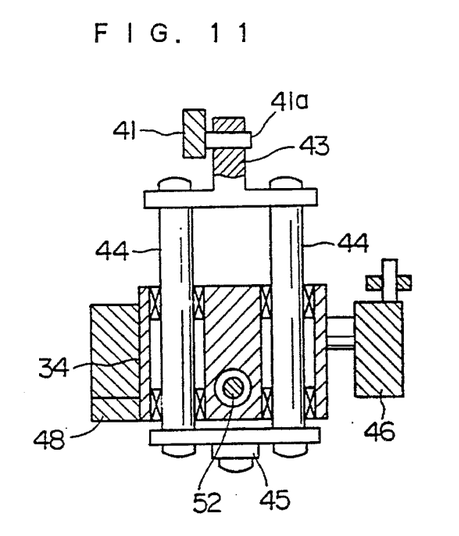
FIG. 11 is a sectional view taken along the line C—C in FIG. 7.

The piston rod of the first cylinder 36 is fixed to a plate 38 which has two push rods 39 and 40 downwardly extending through the table 32. A lower end of the push rod 39 is in contact with an upper surface of a first bell crank 41 (see FIG. 8) which is rotatable about a horizontal shaft 41a mounted under the table 32, while a lower end of the push rod 40 is in proximity to a second bell crank 42 (see FIG. 7) which is rotatable about a horizontal shaft 42a mounted under the table 32. As shown in FIG. 8, a pin 41b fixed to the lower end of the first bell crank 41 is engaged with a follower 43, which is coupled to a first movable pawl 45 through a pair of slide shafts 44. As shown in FIG. 7, another pin 42b fixed to the lower end of the second bell crank 42 is also engaged with a follower 46, which is coupled to a second movable pawl 48 through a pair of slide shafts 47. The slide shafts 44 and 47 slidably pass through the guide block 34 in a horizontal direction, as shown in FIGS. 10 and 11. The first bell crank 41 is urged by a spring 49 anticlockwise in FIG. 8, so that the first movable pawl 45 is regularly urged into a closed position. On the other hand, the second movable pawl 48 is urged by a spring 50 (see FIG. 10) into a closed position. When the first cylinder 36 is driven, the push rods 39 and 40 are integrally downwardly moved. The push rod 39 first pushes down the first bell crank 41 so as to open the first movable pawl 45 as shown by two-dot chain lines in FIG. 8, and then the push rod 40 pushes down the second bell crank 42 so as to open the second movable pawl 48 as shown by two-dot chain lines in FIG. 7.

Further, the piston rod of the second cylinder 37 is fixed to a plate 51 which has a long push rod 52 and a short push rod 53 extending downward. The long push rod 52 has a pusher 52a at the lower end thereof. The long push rod 52 passes through the slide table 32 and the guide block 34 so that the pusher 52a comes close to the pawls 35 and 45. On the other hand, the short push rod 53 is in contact with the upper surface of the first bell crank 41 together with the push rod 39. When the second cylinder 37 is driven, therefore, the pusher 52a is downwardly projected and the first bell crank 41 is downwardly rotated at the same time so as to open the first movable pawl 45.

Figure 12:
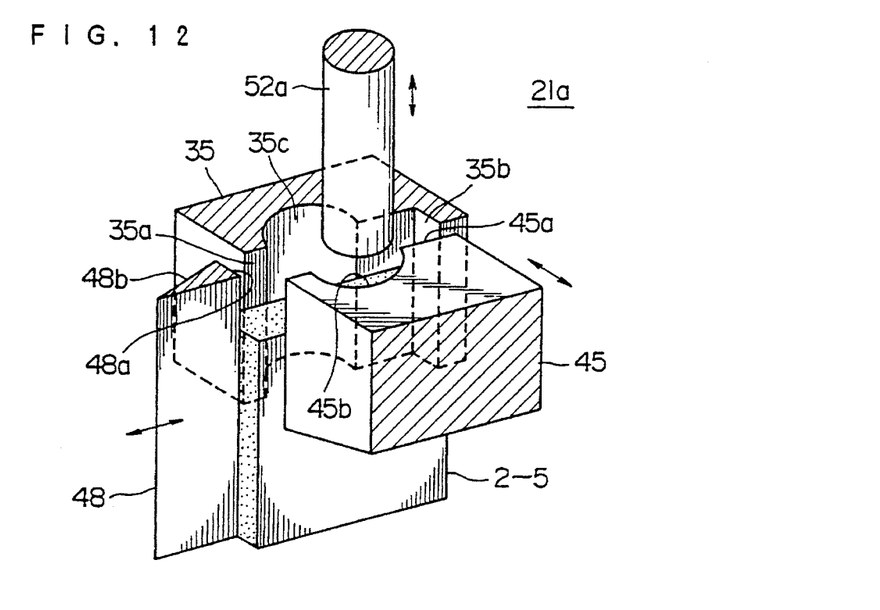
FIG. 12 is a perspective view showing a chuck hand.

FIG. 12 shows the chuck hand 21a which is formed by the pawls 35, 45 and 48 and the pusher 52a.

The fixed pawl 35 is provided with a first vertical surface 35a for supporting a major surface of each part such as a resonator, a terminal, a spring or a case, and a second vertical surface 35b for stopping a rear edge thereof. A groove 35c having a semicircular section is vertically formed in the first surface 35a. The first movable pawl 45, which is moved oppositely to the first surface 35a of the fixed pawl 35, has a third vertical surface 45a for pushing the other major surface of each part in order to hold both major surfaces in association with the first surface 35a of the fixed pawl 35. This pawl 45 is provided on the third surface 45a with a groove 45b corresponding to the groove 35c. The grooves 35c and 45b serve as clearance which can be passed through by the pusher 52a and the protruding portions 6a, 7a, 7b, 8a, and 8b of the terminals 6–9. The second movable pawl 48, which is movable oppositely to the second surface 35b of the fixed pawl 35, has a fourth vertical surface 48a for pushing a front edge of each part toward the second surface 35b of the fixed pawl 35 so that the part is correctly positioned and adjusted in its attitude therebetween. The second movable pawl 48 having a wedge-shaped cross section is provided on an outer side thereof with a guide surface 48b.

The second movable pawl 48, which extends downwardly beyond the pawls 35 and 45 to a portion close to a lower end of each of the resonators 2–5, also serves as a guide for inserting the resonators 2–5 between the terminals 6–9, as hereinafter described. The pusher 52 is used to downwardly push each part, which is chucked by the three pawls 35, 45 and 48.

Figure 13:
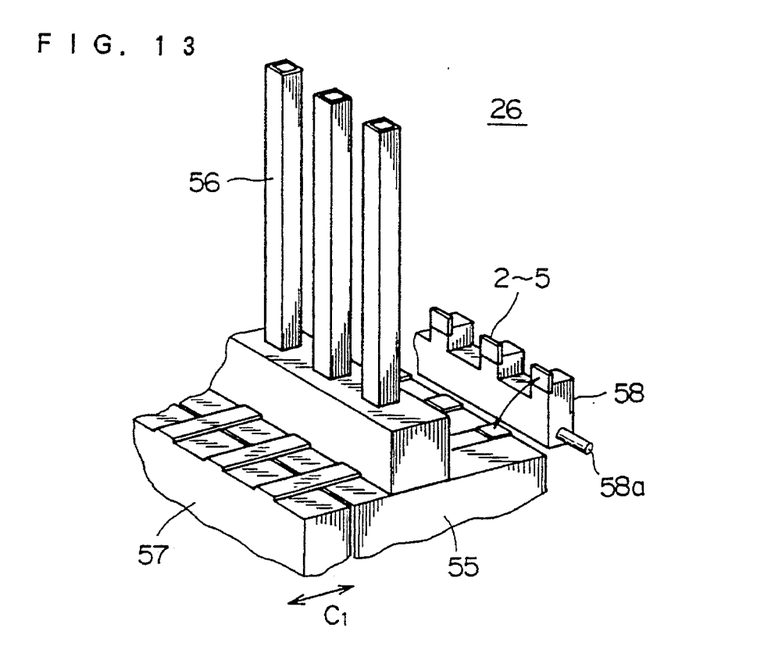
FIG. 13 is a perspective view showing an element-supply unit.
Figure 14:
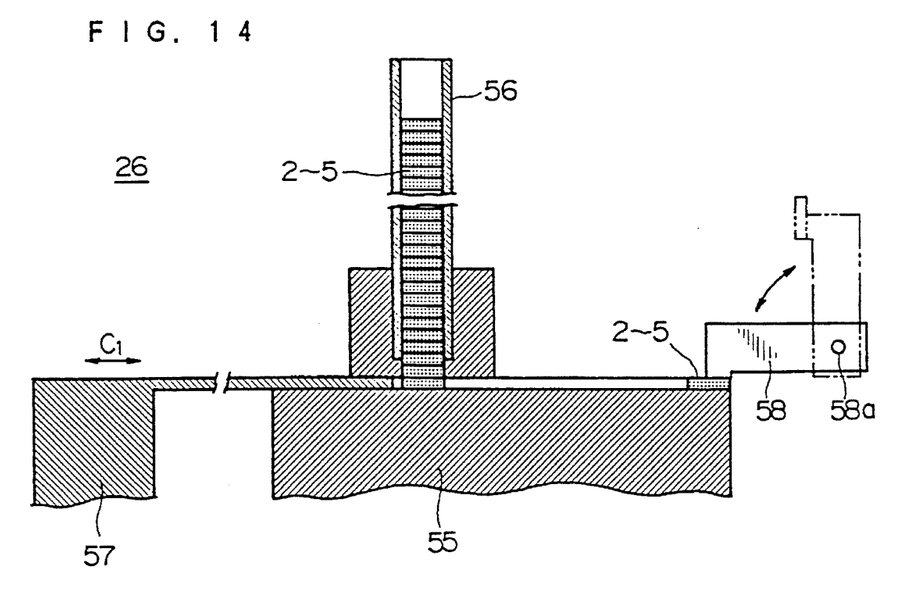
FIG. 14 is a sectional view showing the element-supply unit shown in FIG. 13.

As shown in FIGS. 13 and 14, the element-supply unit 26 comprises a body 55 and a plurality of cassettes 56 which stand uprightly on the body 55, and a pusher 57 which moves in the direction $C_1$. A number of resonators 2–5 of the same type are stacked in each of the cassettes 56. First, resonators 2–5 come down from lower ends of the cassettes 56 in front of the pusher 57, and then are pushed forwardly one by one by the pusher 57 to the forward end of the body 55. Next, the resonators 2–5 are sucked by a vacuum suction member 58 so as to be upwardly rotated about an axis 58a by about 90 degrees. Thereafter, the resonators 2–5 are chucked by the chuck hand 21, and carried into the assembly jig 27. When the cassettes 56 are vacated, they can be easily exchanged by new ones.

Figure 15:
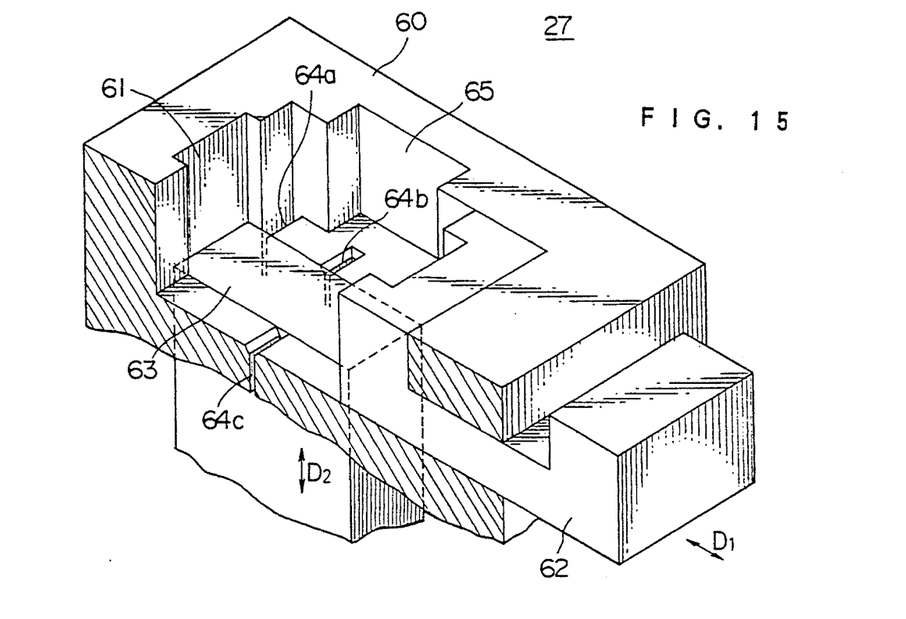
FIG. 15 is a perspective view showing an assembly jig.
Figure 16:
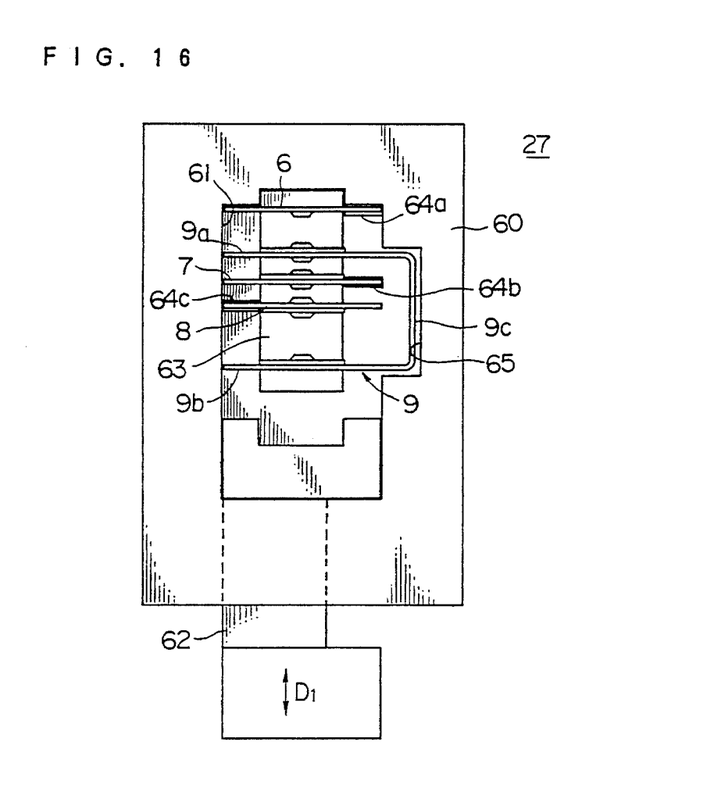
FIG. 16 is a plan view showing the assembly jig receiving terminals.

As shown in FIGS. 15 and 16, the assembly jig 27 is provided with a base 60 having a cavity 61 for receiving parts, and a presser 62 which is movable along a horizontal direction $D_1$ is arranged on one end side of the cavity 61. The depth of the cavity 61 is set to be longer than half of the height of the resonators 2–5 and shorter than the height thereof. An ejector 63, which is vertically movable in a direction $D_2$, is arranged at a central portion of a bottom of the cavity 61, and lead portion receiving holes 64a–64c which have tapered openings at the top thereof are vertically formed on the bottom of the cavity 61 beside the ejector 63. When lead portions 6b, 7c and 8c of the terminals 6–8 are inserted in the holes 64a–64c respectively, the terminals 6–8 are held self-sustainably. An positioning groove 65 is provided on one side surface of the cavity 61 to position the coupling portion 9c of the internal connection terminal 9. The terminals 614 9 are located an constant positions by inner side surfaces of the cavity 61, the holes 64a–64c and the groove 65.

An operation for assembling the parts in the assembly jig 27 by the chuck unit 21 is now described.

First, the chuck unit 21 takes out the terminals 6–9 one by one from the pallet P. At the beginning, the push rods 39 and 40 are downwardly moved by the first cylinder 36 so that the pawls 45 and 48 are kept at their open positions. On the other hand, the push rod 52 and 53 are kept at upper positions. Next, the lift cylinder 33 is driven so that the second movable pawl 48 is inserted in one of the cavity $P_1$–$P_4$ of the pallet P. Then, the push rods 39 and 40 are upwardly moved by the first cylinder 36. At this time, since the second pawl 48 is moved to the closed position prior to the first pawl 45, each of the terminals 6–9 is pushed against the second surface 35b of the fixed pawl 35. Thereafter, the first pawl 45 is moved to the closed position so that the major surfaces of each of the terminals 6–9 upwardly protruding from the pallet P are held between the fixed pawl 35 and the first pawl 45. Thus, two major surfaces and two side edges of each of the terminals 6–9 are held by the chuck hand 21a so that the attitude and position thereof are corrected therein. In this way, each of the terminals 6–9 is taken out by the chuck hand 21a from the pallet P and is carried to the assembly jig 27. When each of the terminals 6–9 is carried to the position corresponding to the cavity 61 of the assembling jig 27, the second cylinder 37 is driven so as to downwardly move the push rods 52 and 53. Therefore, the push rod 53 opens the first pawl 45, and at the same time, the pusher 52a pushes down each of the terminals 6–9 so as to insert them into the cavity 61. Consequently, the terminals 6–9 are inserted into the cavity 61 of the assembling jig 27 without being damaged (see FIG. 16).

Figure 17:
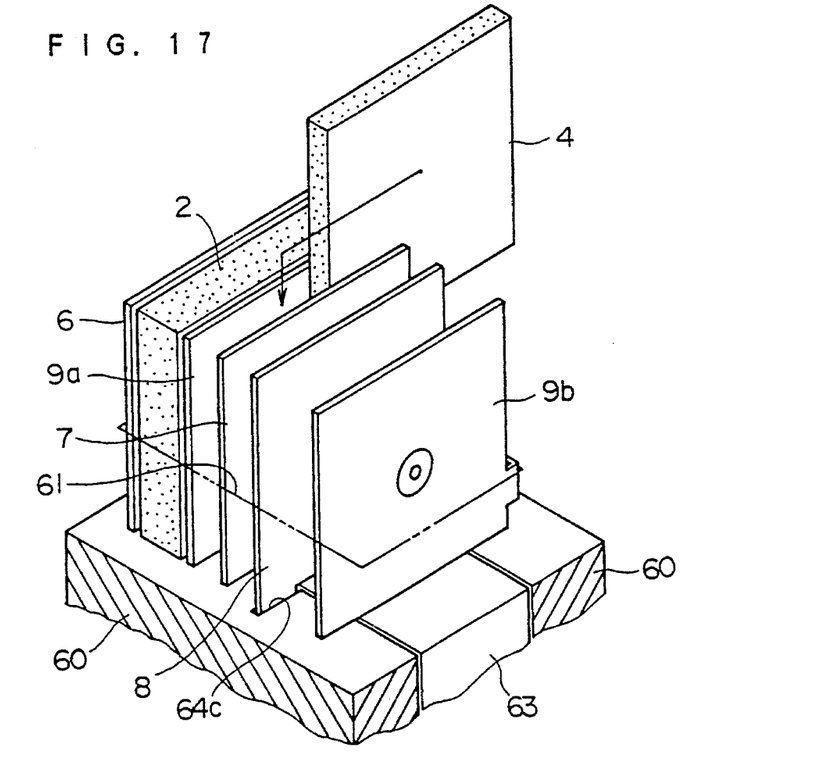
FIG. 17 is a perspective view showing an operation for inserting a resonator between terminal plates.
Figure 18A:
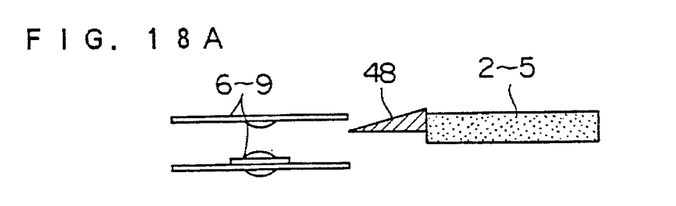
FIGS. 18A and 18B are plan views showing an operation for inserting a resonator between terminal plates.
Figure 18B:
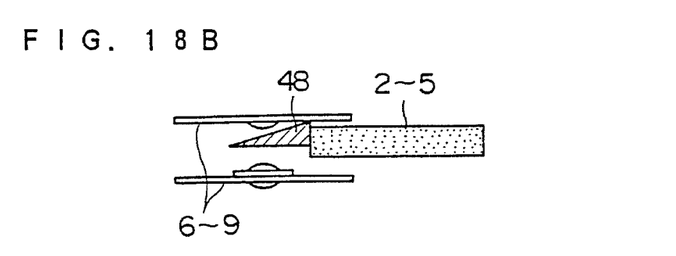

Next, the chuck unit 21 chucks the resonators 2–5 one by one from the element-supply unit 26 so as to carry them to the assembly jig 27. Also in this case, the fix pawl 35 and the movable pawls 45 and 48 hold two major surfaces and two side edges of each of the resonators 2–5 as shown in FIG. 12 so that the attitude and position thereof are corrected therein. The resonators 2–5 are laterally inserted between the terminals 6–9 along the upper surface of the base 60 as shown in FIG. 17, and then the resonators 2–5 are downwardly pushed by the pusher 52a when they reach the position corresponding to the cavity 61. At this time, the terminals 6–9 which are already inserted in the assembly jig 27 self-sustainably may be slightly inclined or slanted so as to hinder the insertion of the resonators 2–5. However, since the second pawl 48 of the chuck hand 21a having a wedge-shaped section separates the terminals 6–9 from each other as shown in FIGS. 18A and 18B, it is possible to smoothly insert the resonators 2–5 between the terminals 6–9. When the resonators 2–5 are inserted by the pusher 52a, the first pawl 45 is opened in association with the pushing operation of the pusher 52a. Therefore, both major surfaces (electrode surfaces) thereof are not damaged since the electrode surfaces of the resonators 2–5 are not in sliding contact with the fixed pawl 35 and the first movable pawl 45.

After the resonators 2–5 are inserted in the aforementioned manner, the plate spring 10 is taken out from the pallet P by the chuck hand 21a and inserted in a clearance between the portion 9b of the internal connection terminal 9 and the presser 62.

Figure 19A:
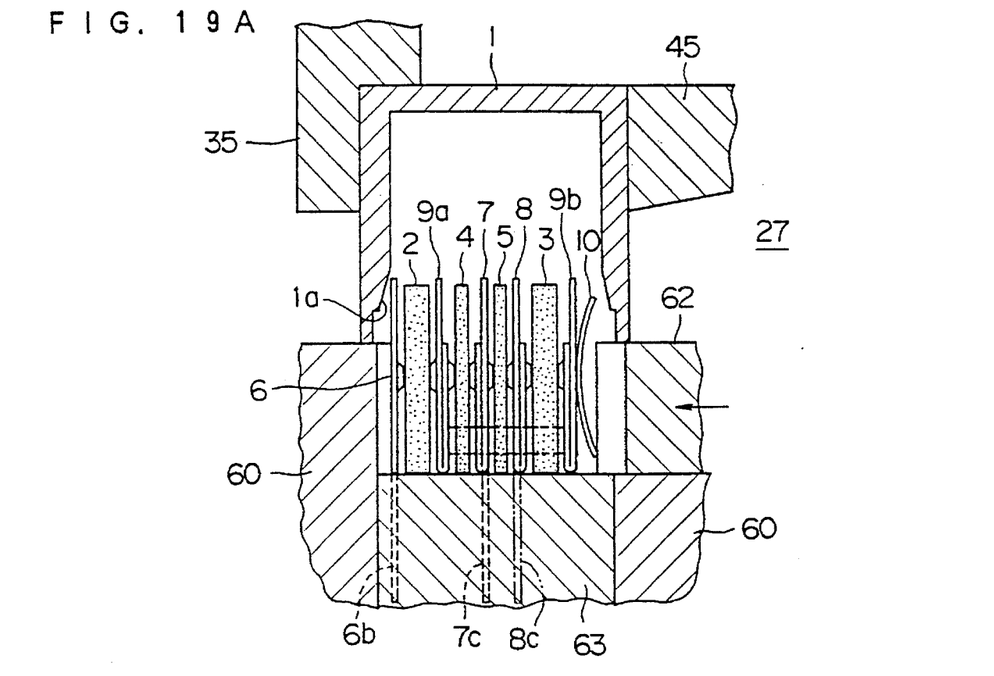
FIGS. 19A and 19B are sectional views showing an operation for inserting parts in a case.
Figure 19B:
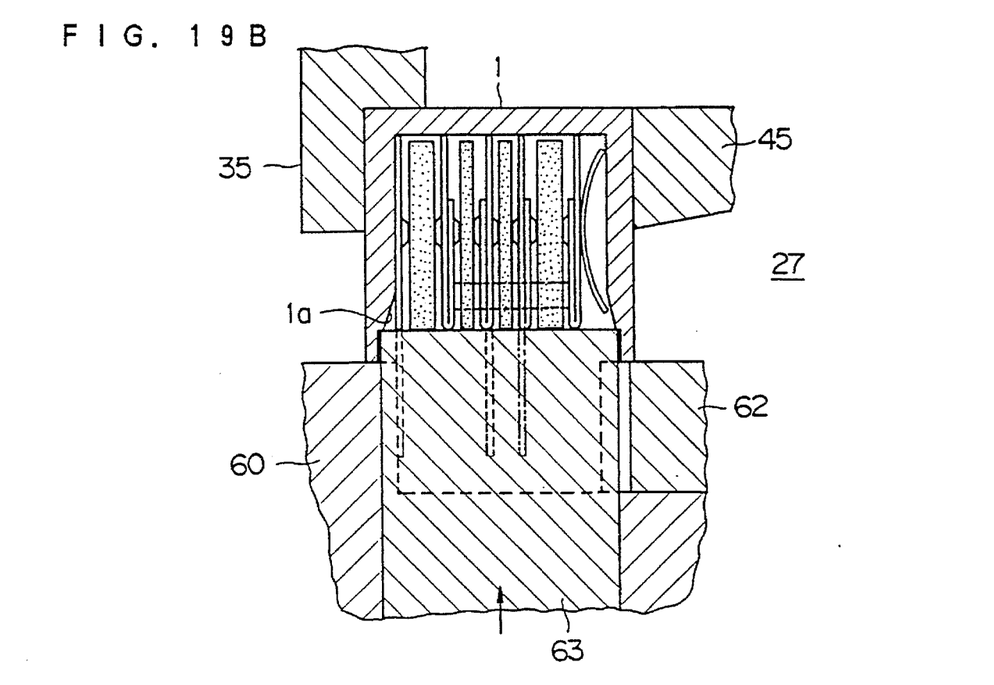

After all parts are assembled in the cavity 61 of the assembly jig 27, the parts are sidewardly compressed by the presser 62 as shown in FIG. 19A, so that the overall thickness of the parts is smaller than the inner size of the case 1. Then, the case 1 is carried from the pallet P onto the assembly jig 27 by the chuck hand 21a, and located on a position for covering all parts which are projected on the base 60. Then, the ejector 63 is upwardly moved as shown in FIG. 19B so as to simultaneously insert all parts in the case 1. At this time, the parts are smoothly inserted due to an inclined surface 1a which is formed in an opening of the case 1. Further, the electrode surfaces of the resonators 2–5 are not damaged since the resonators 2–5 are not in sliding contact with the terminals 6–9.

After the parts are inserted in the case 1 in the aforementioned manner, the case 1 which is chucked by the chuck hand 21a is carried to a cover sheet assembly unit (not shown), so that a cover sheet 11 is assembled in the opening of the case 1.

After the resonators 2–5, the terminals 6–9, the plate spring 10 and the cover sheet 11 are assembled in the case 1, this assembly product is carried to a next sealing step, where the opening of the case 1 is filled up with filler 12 such as resin, to provide a final product.

The present invention is not restricted to the aforementioned embodiment, but various modifications are available, as a matter of course.

Although the terminal plates, the plate springs and the cases are supplied by the pallet in the aforementioned embodiment, the resonators may also be inserted therein. According to the aforementioned embodiment, the resonators are supplied from the element-supply unit which is independent of the pallet, for the reason that the resonators are generally varied with types of filters whereas the terminals, the plate springs and the cases are generally employed in common to various types of the filters.

Further, the chuck unit according to the present invention can be applicable not only to assembling the ladder-type filter as shown in the embodiment, but also to assembling other types of electronic component.

Though the parts are temporarily assembled in the assembly jig by the chuck unit so as to be thereafter simultaneously inserted into the case in the aforementioned embodiment, the parts may alternatively be directly inserted in the case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A chuck unit for chucking and downwardly extruding a workpiece which has two major surfaces, said chuck unit comprising:
   a fixing pawl having a first vertical surface for supporting one of said major surfaces of said workpiece and a second vertical surface being perpendicular to said first vertical surface for stopping one side edge of said workpiece;
   a first movable pawl being movable oppositely to said first vertical surface of said fixed pawl and having a third vertical surface for pushing the other one of said major surfaces of said workpiece in order to hold said workpiece in association with said first vertical surface of said fixed pawl;
   a second movable pawl being movable oppositely to said second vertical surface of said fixed pawl and having a fourth vertical surface for pushing said workpiece against said second vertical surface of said fixed pawl; and
   a pusher being vertically movable between said first vertical surface and said third vertical surface for downwardly extruding said workpiece
   wherein said fixed pawl has a first vertical groove on said first vertical surface,
   said first movable pawl has a second vertical groove on said third vertical surface being opposed to said first vertical groove, and wherein said pusher vertically moves along a clearance defined by said first vertical groove and said second vertical groove.

2. A chuck unit in accordance with claim 1, wherein said first movable pawl is moved outwardly in order to release said workpiece when said pusher downwardly extrudes said workpiece which is held between said second vertical surface and said second movable pawl.

3. A chuck unit for chucking and downwardly extruding a workpiece which has two major surfaces, said chuck unit comprising:
   a fixing pawl having a first vertical surface for supporting one of said major surfaces of said workpiece and a second vertical surface being perpendicular to said first vertical surface for stopping one side edge of said workpiece;
   a first movable pawl being movable oppositely to said first vertical surface of said fixed pawl and having a third vertical surface for pushing the other one of said major surfaces of said workpiece in order to hold said workpiece in association with said first vertical surface of said fixed pawl;
   a second movable pawl being movable oppositely to said second vertical surface of said fixed pawl and having a fourth vertical surface for pushing said workpiece against said second vertical surface of said fixed pawl; and
   a pusher being vertically movable between said first vertical surface and said third vertical surface for downwardly extruding said workpiece
   wherein said second movable pawl has a wedge-shaped cross section tapered to an outer side thereof,
   said second movable pawl extends downwardly beyond said fixed pawl and said first movable pawl to a portion close to a lower end of said workpiece, and wherein said chuck unit is horizontally movable in a direction of said outer side of said second movable pawl.

4. A chuck unit in accordance with claim 3, wherein said first movable pawl is moved outwardly in order to release said workpiece when said pusher downwardly extrudes said workpiece which is held between said second vertical surface and said second movable pawl.

* * * * *